UNITED STATES PATENT OFFICE.

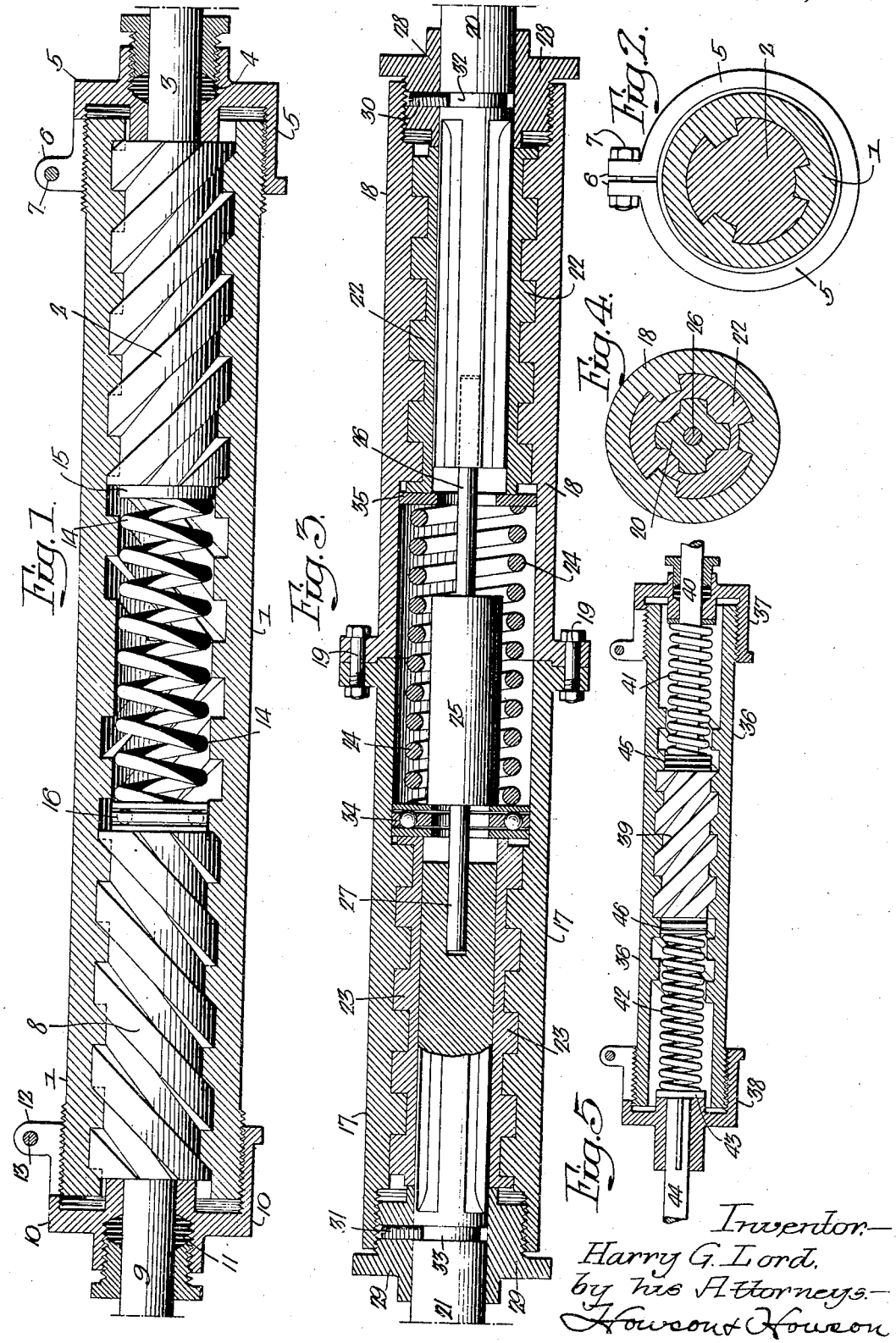

HARRY G. LORD, OF COLLINGSWOOD, NEW JERSEY.

TORSIONAL EQUALIZER.

1,380,225.   Specification of Letters Patent.   Patented May 31, 1921.

Application filed February 17, 1919. Serial No. 277,439.

*To all whom it may concern:*

Be it known that I, HARRY G. LORD, a citizen of the United States, residing in Collingswood, New Jersey, have invented Torsional Equalizers, of which the following is a specification.

One object of my invention is to provide a device of the general type described and claimed in my Patent #1,240,065, dated Sept. 11, 1917, which in addition to being relatively simple, durable and substantial in construction, shall be inexpensive to manufacture;—the arrangement of parts being such as to provide a torsionally resilient element adapted for connection in a line of power transmission shafting or between any other power transmitting elements, which shall effectually absorb or prevent the transmission of shocks while at the same time compensating for sudden changes in either the power or the load.

These objects and other advantageous ends I secure as hereinafter set forth, reference being had to the accompanying drawings, in which, Figures 1 and 2 are respectively longitudinal and transverse sections of a torsional equalizer constructed in accordance with my invention;

Figs. 3 and 4 are longitudinal and transverse sections of a modification of the invention; and Fig. 5 is a longitudinal section of a second modification.

In Figs. 1 and 2 of the above drawings, 1 represents an elongated sleeve or housing having two opposite internal threads each extending from its middle to one of its ends. Operative within one of these threaded portions of the sleeve is a correspondingly threaded head 2, shown in the present instance as rigidly attached to or formed integral with a shaft 3 which passes into said sleeve through a stuffing box 4 formed in a cap 5, threaded onto the adjacent end of the sleeve. For retaining this cap in place its threaded portion is preferably split parallel to the axis of the sleeve and at either side of the slot or kerf formed for this purpose, are projecting lugs 6 which may be drawn together by a bolt 7 to rigidly clamp said cap in place.

The opposite end of the sleeve 1 likewise has operative within it a head 8 threaded to coöperate with the second set of internal threads and rigidly connected to or formed integral with a second shaft section 9. This also extends into the sleeve 1 through a stuffing box 11 formed in a cap 10, which is longitudinally split, and provided with projecting lugs 12 drawn together by a bolt 13.

Within the sleeve 1, between the two threaded heads 2 and 8, is mounted a relatively strong coiled spring 14, one end of which has a washer 15 interposed between it and the head 2 while between its opposite end and the head 8 is mounted an anti-friction bearing 16. With this arrangement of parts if the shaft 9 be connected to apparatus to be driven and the shaft 3 be connected to a suitable source of power, then under operating conditions when the latter shaft is turned, the head 2 is screwed into the sleeve 1 until the spring 14 is so far compressed that said sleeve is forced to turn with the head 2, owing to the friction between its threads and those of the sleeve. Such motion is obviously transmitted from the sleeve to the shaft 9 since the head 8 thereon is threaded oppositely to the head 2 and normally abuts upon the cap 10.

The head 2 will thereafter remain in a fixed position relatively to the sleeve 1 as long as the load transmitted remains constant, although it will be forced outwardly from the sleeve by the action of the spring 14 if said load is suddenly or otherwise diminished or be further screwed in the sleeve when said load is suddenly increased, thus serving as a yieldable element automatically preventing the transmission of shocks or sudden variations of load.

If the direction of rotation of the shaft 3 be reversed, the head 2 will screw outwardly in the sleeve 1 until it strikes upon that portion of the cap 5 immediately surrounding said shaft, after which the sleeve 1 will turn with said head and the shaft 3 to which it will then be connected.

Owing to the formation of the threads connecting the head 8 and the sleeve 1, said head will be now caused to screw into the latter in which as in the case of the head 2, it will assume a floating or balanced position, when the spring 14 has been compressed to such an extent that the force exerted by it is equal to the friction between the threads of the head 8 and those of the sleeve 1. Thereafter these latter elements act similarly to the head 2 and sleeve 1 in absorbing any shocks which would otherwise be transmitted between the shafts 3 and 9 and in compensating for any abrupt changes in power or load.

While in some forms of my invention I employ the stuffing boxes 4 and 11 in order to insure the retention within the sleeve 1 of a suitable lubricant, it is obvious in some cases these may be omitted without departing from my invention, as shown in that form of the device illustrated in Figs. 3 and 4. In this modification the threaded sleeve is made in two sections 17 and 18, flanged at their adjacent ends and coupled together by bolts 19. One feature of this form of the invention resides in the provision of a splined connection between the two shafts 20 and 21 and the threaded heads of the tube 23 for the purpose of avoiding the necessity for longitudinal movement of said shafts under operating conditions.

In that form of the invention shown in Fig. 1, the shafts 3 or 9 move longitudinally with their attached heads 2 and 8 when power is transmitted, thus requiring some provision in their mounting and connection which will permit of such action. By making the heads 22 and 23 tubular and providing them with internal splines designed to coöperate with correspondingly formed keyways in the shafts 20 and 21, they are free to move longitudinally upon the operation of my device without affecting said shafts. As before, a spring 24 is mounted between the adjacent ends of the heads 22 and 23, and when power is transmitted by rotation of the shaft 20 in one direction, the sleeve 22 turns in the section 10 of the threaded sleeve to a position of equilibrium, moving longitudinally of the shaft 20 in so doing.

In order to prevent the complete closing up or collapse of the coils of the spring 24 in case of the imposition of an abnormal load, I mount between the two heads 22 and 23, a member such as the cylinder 25 which will be engaged by both of them before the convolutions of the spring 24 so far collapse as to come into engagement with each other. This member is preferably supported within the spring 24 by means of axially extending rods or dowels 26 and 27 which project into suitable axial recesses in the shafts 20 and 21 respectively. In this case the caps 28 and 29 are externally threaded and screwed into the suitably threaded ends of the sleeve 17, being provided with set screws 30 and 31 which enter annular grooves 32 and 33 in the shafts 20 and 21 in order that the latter may rotate relatively to said caps and sleeve without being able to move longitudinally thereof. As before I preferably mount an anti-friction bearing 34 between one end of the spring and the adjacent head, and also place a washer 35 between the other head and the opposite end of said spring.

In that form of my invention shown in Fig. 5, I have shown the sleeve 36 as having a pair of caps 37 and 38 threaded on its ends, and with its interior wall provided with a single screw thread for coöperation with the threads of a single movable head 39 which normally occupies a position adjacent its middle. In this particular case one of the shafts 40 is rigidly connected to or formed integral with said head and has a coiled spring 41 mounted between the latter and the cap 37.

A second spring 42 is mounted between the opposite end of said threaded head and a washer 43 which abuts upon the cap 38 which is keyed or otherwise suitably connected to the second shaft 44. Anti-friction bearings 45 and 46 are preferably mounted between the two bearings 41 and 42 and the adjacent ends of the threaded head 39, so that under operating conditions the latter is turned by its shaft 40 in a direction depending upon its direction of rotation, until by reason of the compression of one or the other of the springs 41 or 42, it compels the sleeve 36 and hence the second shaft 44 to turn with it. In this case I have shown a stuffing box as provided in the cap 37 for the passage of the shaft 40 and this cap as well as the cap 38 are shown as clamped to the sleeve.

While I have referred to the elements 1, 17—18 and 36 as "sleeves," it is to be understood that their function is to serve as housings as well as to coöperate with the threaded head or heads of the shaft sections in transmitting power between the latter and it is likewise to be understood that their forms and mounting may be widely varied without departing from my invention.

I claim:—

1. The combination in a torsional equalizer of driving and driven shafts; means for imparting movement from the driving shaft to the driven shaft, said means comprising a sleeve; two threaded members operatively connected to said shafts respectively and disposed within the sleeve; and resilient means within the sleeve to resist relative movement of the said threaded members and the sleeve.

2. The combination in a torsional equalizer for connecting a driving and a driven shaft of a sleeve having oppositely threaded portions; heads threaded into said portions; shafts connected to said heads; and resilient means disposed within said sleeve to oppose movement of either head relatively to the sleeve.

3. The combination in a torsional equalizer of driving and driven shafts; means for imparting movement from the driving shaft to the driven shaft, said means comprising a sleeve having two oppositely threaded portions; two heads threaded into said portions and operatively connected to said shafts; and resilient means interposed between said heads to resist movement of either head relatively to the sleeve.

4. The combination in a torsional equalizer of two members of which one is threaded into the other; a spring mounted to cause rotary motion to be transmitted from one of said members to the other after it has been compressed by a screwing of one member into the other to a predetermined extent; with a device internally of said spring for limiting the amount of compression thereof.

5. The combination in a torsional equalizer of a sleeve having two oppositely threaded portions; two shaft sections respectively having portions coacting with said threaded portions of the sleeve to impart movement one to the other; and a spring mounted within the sleeve to resist movement of either shaft section relatively to the sleeve.

6. The combination in a torsional equalizer of a sleeve having two internal oppositely threaded portions; two heads threaded into said portions respectively; two shaft sections splined to said heads respectively; and means for opposing movement of either head relatively to the sleeve.

7. The combination in a torsional equalizer of a sleeve having two internal oppositely threaded portions; two heads threaded into said portions respectively; two shaft sections splined to said heads respectively; and means including a coiled spring mounted between the heads for opposing movement of either head relatively to the sleeve.

8. The combination in a torsional equalizer of a sleeve having two internal oppositely threaded portions; two heads threaded into said portions respectively; two shaft sections splined to said heads respectively; means including a coiled spring mounted between the heads for opposing movement of either head relatively to the sleeve; with an element within the spring for limiting the compression thereof.

9. The combination in a torsional equalizer of a sleeve having two opposite internal threads; two heads threaded to coöperate with said threads respectively; shaft sections respectively connected to the heads; resilient means within the sleeve for opposing relative movement of either of the heads relatively to the sleeve; and closures for the ends of the sleeve, extending around said shaft sections.

10. The combination in a torsional equalizer of a sleeve having two opposite internal threads; two heads coöperating with said threads respectively; shaft sections respectively connected to the heads; resilient means for opposing movement of either of the heads relatively to the sleeve; closures for the ends of the sleeve consisting of members threaded thereto; with pins in said members respectively entering annular recesses of the shaft sections.

11. The combination in a torsional equalizer of a sleeve having two sets of oppositely formed threads; heads formed to coöperate with the threads of the sleeve; shaft sections respectively connected to said heads; a spring mounted between the heads to resist certain movements thereof relatively to the sleeve; and an anti-friction bearing mounted between one of the heads and said spring.

12. The combination in a torsional equalizer of an internally threaded sleeve; two shaft sections of which one is operatively connected to the sleeve; a head threaded into the threaded portion of the sleeve and operatively connected to the other shaft section; closures for the ends of the sleeve; and stuffing boxes between the closures and the shaft sections respectively.

In witness whereof I affix my signature.

HARRY G. LORD.